United States Patent [19]

Motrenec

[11] Patent Number: 4,736,962
[45] Date of Patent: * Apr. 12, 1988

[54] STEERING STABILIZER FOR VEHICLES

[76] Inventor: Donald L. Motrenec, 205 11 St., Huntington Beach, Calif. 92648

[*] Notice: The portion of the term of this patent subsequent to Jan. 28, 2003 has been disclaimed.

[21] Appl. No.: 842,679

[22] Filed: Mar. 21, 1986

[51] Int. Cl.$^4$ .............................................. B62K 21/08
[52] U.S. Cl. ...................... 280/272; 180/79; 188/290; 188/319; 280/90
[58] Field of Search .................. 280/272, 276, 279, 89, 280/90; 188/290, 319, 266; 180/78, 79, 149

[56] References Cited

U.S. PATENT DOCUMENTS

| | | | |
|---|---|---|---|
| 1,047,948 | 12/1912 | Karminski | 188/290 |
| 1,917,972 | 7/1933 | Henroit | 188/290 |
| 2,032,966 | 3/1936 | Yoxall | 188/290 |
| 2,077,080 | 4/1937 | Tolman | 188/290 |
| 4,025,246 | 5/1977 | Normandin | 188/290 |
| 4,042,079 | 8/1977 | Doolittle | 188/290 |
| 4,492,541 | 1/1985 | Mallen-Herrero | 188/290 |
| 4,558,878 | 12/1985 | Montrenec | 280/272 |
| 4,566,712 | 1/1986 | Montrenec | 280/272 |

FOREIGN PATENT DOCUMENTS

| | | | |
|---|---|---|---|
| 1292018 | 4/1963 | Fed. Rep. of Germany | 280/90 |
| 44276 | 3/1909 | France | 188/90 |
| 825656 | 11/1936 | France | 280/90 |
| 37341 | 3/1983 | Japan | 188/290 |
| 57532 | 4/1983 | Japan | 188/290 |
| 270808 | 5/1927 | United Kingdom | 280/272 |

*Primary Examiner*—John J. Love
*Assistant Examiner*—Everett G. Diederiks, Jr.
*Attorney, Agent, or Firm*—Edgar W. Averill, Jr.

[57] ABSTRACT

A steering stabilizer for handlebar controlled vehicles. The stabilizer utilizes a steering column housing having a cylindrical chamber therein. The steering column passes through the axial center of the chamber and hydraulic fluid is held within the chamber. A piston or vane is moved by the turning of the steering column and forces the hydraulic fluid through a restricted passageway whereby the turning of the handle bars is viscously damped.

3 Claims, 2 Drawing Sheets

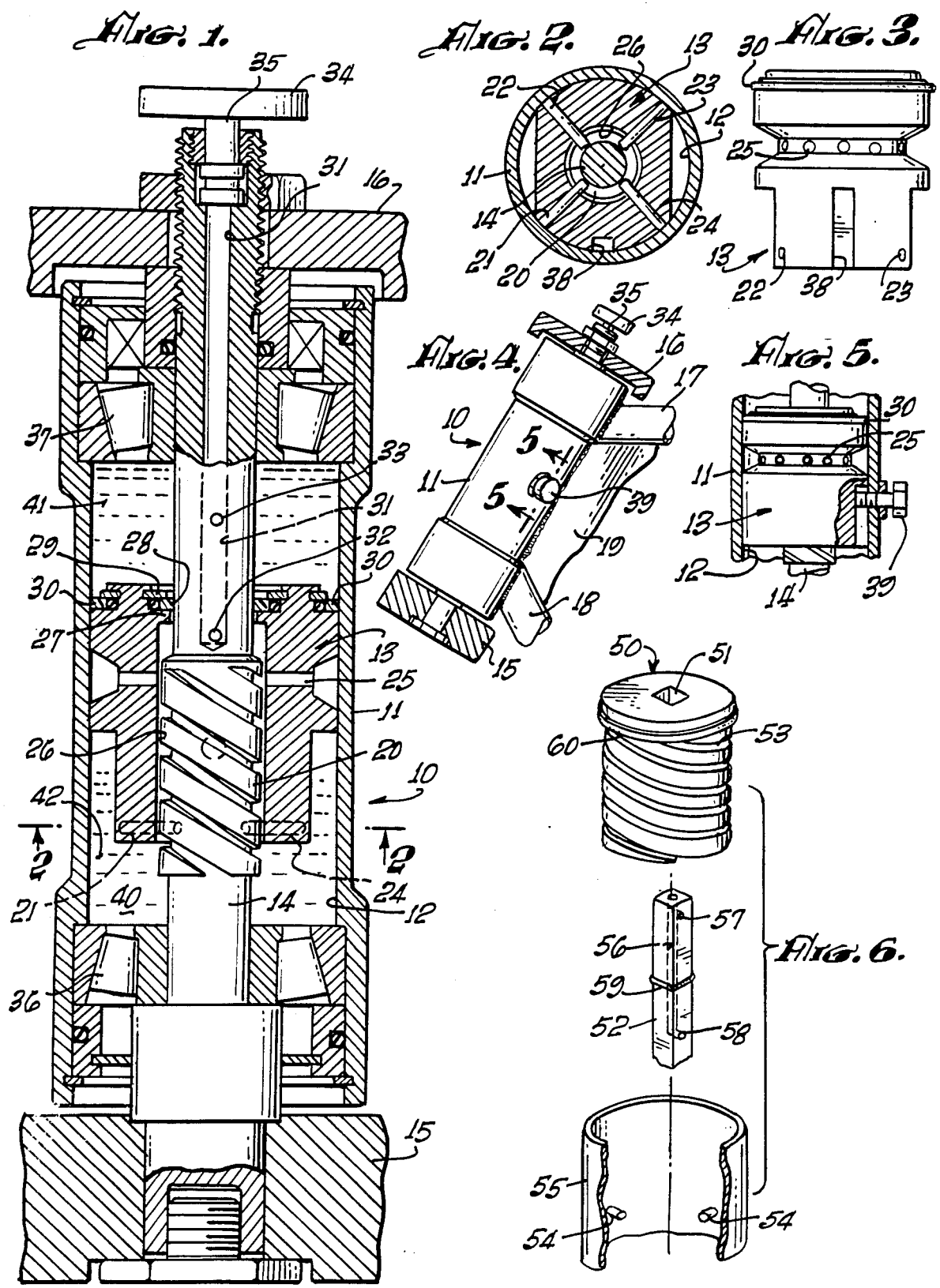

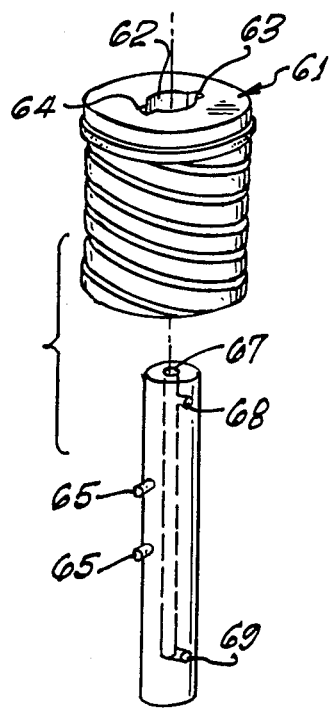
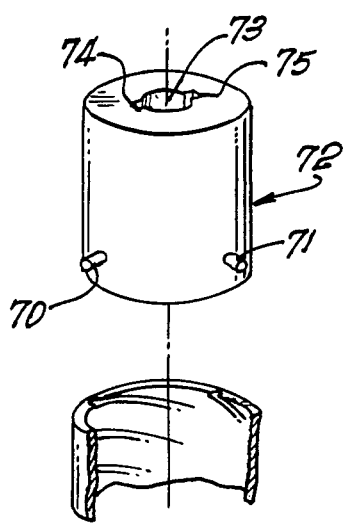
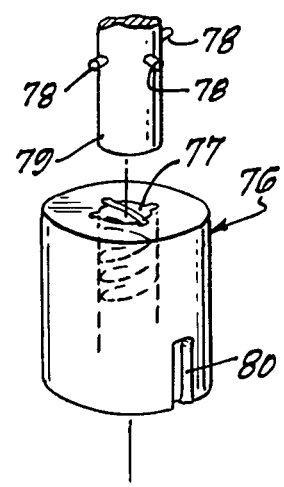
Fig. 7.   Fig. 8.   Fig. 9.
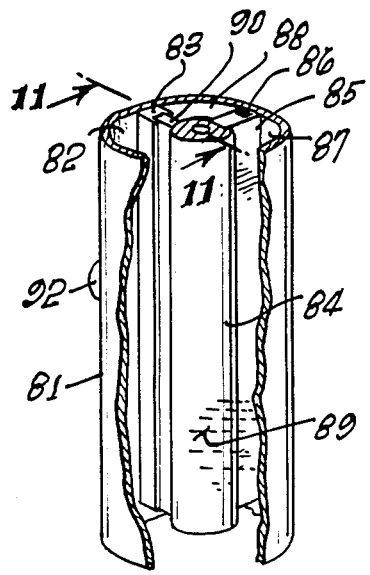
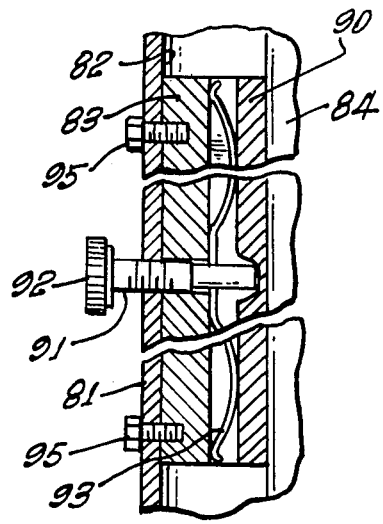
Fig. 10.   Fig. 11.

STEERING STABILIZER FOR VEHICLES

BACKGROUND OF THE INVENTION

The field of the invention is motor vehicles and the invention is especially useful on motor vehicles which are controlled by handle bars. In applicant's U.S. Pat. No. 4,566,712, there was disclosed and claimed a steering stabilizer which called for a threaded steering column which caused a piston to move up and down within a cylindrical chamber. The present application describes alternate means for carrying out this basic function. That is, in its broadest concept, applicant's invention is a hydraulic fluid-filled chamber within the steering column housing, which chamber holds a piston or vane which is moved by the turning of the steering column within the steering column housing. A restricted passageway is provided so that the moving of the piston or vane forces fluid through the restricted passageway thereby causing the turning of the handle bars to be viscously damped.

SUMMARY OF THE INVENTION

It is, thus, an object of the present invention to provide steering stabilizer designs which cause viscous damping to the turning of handle bars in a vehicle.

The present invention is for a steering stabilizer for handlebar controlled vehicles. The stabilizer comprises a steering column housing affixed to the frame of a vehicle, said housing having a cylindrical chamber along its inner surface. A steering column is affixed to the handle bars of the vehicle and the steering column passes axially through the chamber. The steering column is affixed to a steerable wheel of the vehicle. Hydraulic fluid means is held within the cylindrical chamber. Piston means are held within said chamber, dividing the chamber into at least a first and second compartment, said piston means being moved by the turning of the steering column to move the piston between at least said first and second compartments. Restricted passageway means are provided between the two compartments, whereby the turning of the steering column forces fluid through the restricted passageway, whereby the turning of the handle bars is viscously damped. The piston may be a hollow cylinder having threads or thread followers on its inner or outer surface or, alternatively, may be a vane affixed to the steering column.

BRIEF DESCRIPTION OF THE DRAWINGS

FIG. 1 is a cross-sectional view of the steering stabilizer of the present invention.

FIG. 2 is a cross-sectional view taken along line 2—2 of FIG. 1.

FIG. 3 is a side view of the piston of the steering stabilizer of FIG. 1.

FIG. 4 is a side view of the exterior of the stabilizer of FIG. 1 attached to the frame of a vehicle.

FIG. 5 is a schematic view showing one method of preventing the turning of the piston within a steering column housing.

FIG. 6 is an exploded, perspective view of an alternate embodiment of the steering stabilizer of FIG. 1.

FIG. 7 is an exploded, perspective view of an alternate embodiment of the steering stabilizer of FIG. 1.

FIG. 8 is a perspective view of an alternate embodiment of the piston of the steering stabilizer of FIG. 1.

FIG. 9 is an exploded, perspective view of an alternate embodiment of the steering column and piston of the steering stabilizer of FIG. 1.

FIG. 10 is a perspective view partially cut away of an alternate embodiment of the steering stabilizer of FIG. 1.

FIG. 11 is a cross-sectional view taken along line 11—11 of FIG. 10.

DESCRIPTION OF THE PREFERRED EMBODIMENTS

One configuration of the steering stabilizer of the present invention is shown in cross-sectional view in FIG. 1 and indicated generally by reference character 10. Stabilizer 10 has a steering column housing 11 which has a hollow, cylindrical chamber 12 along which piston 13 rides. The steering column 14 is affixed to lower triple clamp 15 and upper triple clamp 16 in a conventional manner. Steering column housing 11 is welded, or otherwise affixed to a frame, as shown in FIG. 4 where the frame has an upper frame bar 17, a lower frame bar 18 and a gusset plate 19.

As shown in FIG. 1, steering column 14 has a threaded portion 20 and piston 13 has four thread followers, or pins, 21 through 24. Piston 13 also has a plurality of fluid ports 25 which pass from the exterior of the piston to an inner bore 26. Piston 13 has a shoulder 27 which supports a seal such as a teflon seal 28 held by a retaining ring 29. An upper teflon seal 30 is held in a groove near the upper, outer surface of piston 13.

An axial bore, shown in phantom view in FIG. 1 and indicated by reference character 31, is intersected by a pair of openings 32 and 33, thus providing a restricted fluid path through opening 32, axial bore 31 and opening 33. The resistance to fluid flow may be adjusted by the turning of knob 34, which is attached to a rod 35, which extends into the intersection of opening 33 and axial bore 31. The details of construction of the adjustment knob are shown in applicant's U.S. Pat. No. 4,566,712 which is incorporated by reference herein. The details of construction of the adjustment knob do not form an essential feature of the present invention, and various means for providing such adjustment is possible.

The steering column is supported by a pair of bearings 36 and 37 in a conventional manner which permits the turning of the steering column within the steering column housing 11. A key way 38 is intersected by the end of a bolt 39 (see FIG. 4) which prevents the turning of piston 13 within hollow, cylindrical chamber 12.

Thus in operation, when the handle bars are turned, the upper and lower triple clamp and its associated steering column are turned with respect to steering column housing 11. The thread followers, or pins, 21 through 24 ride up or down along threaded portion 20 causing piston 13 to move upwardly and downwardly within hollow, cylindrical chamber 12. Chamber 12 is completely filled with a hydraulic fluid 40 such as mineral oil. Thus, since fluid flow is essentially prevented past teflon seal 30, or past teflon seal 28, it must, therefore, flow through the restricted passageway through opening 32, bore 31 and opening 33. This restricted fluid flow, therefore, provides viscous damping to the turning of the vehicle wheels. It can be seen that the piston 13 divides the hollow, cylindrical chamber 12 into an upper compartment 41 and a lower compartment 42.

FIGS. 6 through 9 show in a schematic way various alternative methods for causing a hollow, cylindrical piston to move up and down within a cylindrical chamber to force fluid between first and second compartments through a restricted fluid passageway. Thus, in FIG. 6, piston 50 has a square passageway 51 into which a square steering column 52 passes. Threads 53 are formed on the outer surface of piston 50, and these cooperate with thread followers 54 on the inner surface of steering column housing 55. A fluid passageway 56 passes downwardly in the center of steering column 52 and is intersected by an upper opening 57 and a lower opening 58. A seal 59 prevents fluid flow between steering column 52 and square passageway 51. Thus, the turning of the steering column turns the piston which is caused to move up and down by the action of thread followers 54 in threads 53. An upper seal 60 prevents fluid flow between piston 50 and the inner surface of steering column housing 55.

A very similar apparatus is shown schematically in FIG. 7 where piston 61 has a central bore 62 which has a pair of longitudinal key ways 63 and 64, which guide two pairs of pins 65, which prevent the turning of piston 61 with respect to steering column 66. A central bore 67 is intersected by two openings 68 and 69 and provide a restricted fluid passageway analogous to that described above. Instead of threading the outside of the piston, the inside of the steering column could be threaded and the threads followed by thread followers 70 and 71 shown on the exterior of piston 72 in FIG. 8. Piston 72 has a central bore 73 and key ways 74 and 75 analogous to those shown in FIG. 7.

Yet another possible combination is shown in exploded, perspective view in FIG. 9 where piston 76 has a threaded bore 77 in which thread followers 78 on steering column 79 ride. Like piston 13, piston 76 should have a key way 80, or other means, for preventing the piston from turning when the steering column 79 is turned.

An approach not using a hollow piston is shown in FIG. 10 where steering column housing 81 has a hollow, cylindrical bore 82 to which a fixed vane 83 is welded or otherwise held. A steering column 84 may be turned within steering column housing 81 and has a movable vane 85 welded, or otherwise affixed, thereto. Preferably, movable vane 85 has a teflon seal 86 along its outer surface. Movable vane 85 divides the hollow, cylindrical bore 82 into a first compartment 87 and a second compartment 88. A restricted fluid flow path is preferably provided either through an opening in fixed vane 83 or, as shown in FIG. 10, around the outer surface of steering column 84 and a movable bar 90 shown best in FIG. 11. Steering column housing 81 is, of course, filled with a hydraulic fluid indicated generally by reference character 89.

Preferably, movable bar 90 is adjustable from the exterior of the steering column housing 81, and one such means of providing such adjustment is shown in FIG. 11 where movable bar 90 is moved in and out by the turning of threaded rod 91 which is attached to knob 92. Leaf spring 93 tends to hold bar outwardly from the groove 94 in which it is held. One means for holding vane 83 in place is a plurality of bolts 95 shown in FIG. 11. It can readily be seen that the turning of steering column 84 moves movable vane 85 forcing hydraulic fluid 89 through the restricted fluid passageway between steering column 84 and bar 90.

It is believed that numerous configurations for moving hydraulic fluid between two or more compartments are possible and the essential elements of the present invention include a steering column housing, a steering column, hydraulic fluid, piston means which is moved by the turning of the steering column within the steering column housing and a restricted hydraulic fluid passageway through which fluid is forced when the piston is moved. The addition of such steering stabilizer to a two-wheel motorcycle, or other handlebar steering vehicle, has proved a very effective way of reducing rider fatigue and improving safety. It is also highly beneficial that the amount of restriction of fluid flow be adjustable so that the rider can provide an appropriate amount of viscous damping depending on the type of terrain and the type of riding involved.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A steering stabilizer in a vehicle having a frame and a steerable wheel mounted on said frame and controlled by means of handlebars, said stabilizer comprising:
    a steering column housing affixed to said frame, said housing defining a cylindrical chamber along its inner surface;
    a steering column affixed at an upper end thereof to said handlebars, passing axially through said chamber, and being connected at a lower end thereof to said steerable wheel;
    hydraulic fluid means within said cylindrical chamber between said steering column and said inner surface;
    fluid moving means within said chamber, said fluid moving means comprising a movable vane affixed to said steering column and extending radially outward therefrom to substantially the inner surface of said chamber;
    a fixed vane attached to and extending radially inward from said inner surface to substantially the outer surface of said steering column;
    said movable vane and said fixed vane dividing said chamber into first and second compartments;
    restricted passageway means between said first and second compartments;
    said movable vane being rotated by the turning of said steering column by means of said handlebars to enlarge the first compartment while contracting the second compartment when the steering column is rotated in one direction and to enlarge the second compartment while contracting the first compartment when the steering column is rotated in the opposite direction thereby causing the hydraulic fluid means to be forced through said restricted passageway means between the first and second compartments whereby the turning of the handlebars is viscously damped.

2. The steering stabilizer of claim 1 further including means to vary the area of said restricted passageway means whereby the resistance to fluid flow therethrough is adjustable .

3. A steering stabilizer as recited in claim 1 wherein said fixed vane comprises a fixed portion and an adjustable bar portion, said fixed portion being rigidly secured to said inner surface and said adjustable bar portion being connected to said fixed portion by a radially extending adjustment means, said restricted passageway means being located between said adjustable bar portion and said steering column, said adjustable bar portion being movable in a radial direction by said adjustment means to vary the area of said restricted passageway means whereby the resistance to fluid flow therethrough is adjustable.

* * * * *